United States Patent
Levy et al.

(10) Patent No.: US 7,702,125 B2
(45) Date of Patent: Apr. 20, 2010

(54) WATERMARKING SYSTEMS AND METHODS

(75) Inventors: Kenneth L. Levy, Stevenson, WA (US);
Ravi K. Sharma, Portland, OR (US);
Lance Lixin Shen, Tualatin, OR (US);
John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 1619 days.

(21) Appl. No.: 10/774,312

(22) Filed: Feb. 5, 2004

(65) Prior Publication Data

US 2004/0250080 A1 Dec. 9, 2004

Related U.S. Application Data

(60) Provisional application No. 60/445,478, filed on Feb. 5, 2003.

(51) Int. Cl.
*G06K 9/00* (2006.01)
(52) U.S. Cl. .................................. 382/100
(58) Field of Classification Search .......... 382/100
See application file for complete search history.

(56) References Cited

U.S. PATENT DOCUMENTS

| | | | |
|---|---|---|---|
| 5,664,018 A | 9/1997 | Leighton | |
| 5,930,369 A * | 7/1999 | Cox et al. | 380/54 |
| 5,949,885 A | 9/1999 | Leighton | |
| 6,101,602 A | 8/2000 | Fridrich | |
| 6,122,403 A | 9/2000 | Rhoads | |
| 6,145,081 A | 11/2000 | Winograd et al. | |
| 6,266,430 B1 * | 7/2001 | Rhoads | 382/100 |
| 6,408,082 B1 | 6/2002 | Rhoads | |
| 6,430,301 B1 | 8/2002 | Petrovic | |
| 6,614,914 B1 | 9/2003 | Rhoads et al. | |
| 6,654,479 B1 * | 11/2003 | Liao et al. | 382/100 |
| 6,668,069 B1 | 12/2003 | Herley | |
| 6,707,926 B1 * | 3/2004 | Macy et al. | 382/100 |
| 6,778,587 B1 | 8/2004 | Malvar et al. | |
| 6,792,130 B1 * | 9/2004 | Jones et al. | 382/100 |
| 6,807,634 B1 | 10/2004 | Braudaway et al. | |
| 6,856,977 B1 | 2/2005 | Adelsbach et al. | |
| 6,865,273 B2 * | 3/2005 | Wendt | 382/100 |
| 6,901,515 B1 | 5/2005 | Muratani | |
| 6,947,571 B1 | 9/2005 | Rhoads et al. | |
| 7,020,285 B1 | 3/2006 | Kirovsky | |
| 7,047,413 B2 | 5/2006 | Yacobi et al. | |
| 7,072,490 B2 | 7/2006 | Stach | |
| 7,206,430 B2 | 4/2007 | Pelly et al. | |
| 2001/0055390 A1 * | 12/2001 | Hayashi et al. | 380/220 |
| 2002/0021808 A1 | 2/2002 | Iwamura | |
| 2002/0095577 A1 | 7/2002 | Nakamura et al. | |
| 2003/0012401 A1 | 1/2003 | Sharma et al. | |
| 2003/0023856 A1 | 1/2003 | Horne et al. | |
| 2003/0026422 A1 | 2/2003 | Gerheim et al. | |
| 2003/0031318 A1 | 2/2003 | Troyansky et al. | |
| 2003/0056103 A1 | 3/2003 | Levy et al. | |
| 2003/0112974 A1 | 6/2003 | Levy | |
| 2003/0188168 A1 | 10/2003 | Muratani | |
| 2004/0168065 A1 | 8/2004 | Pelly et al. | |
| 2005/0039020 A1 | 2/2005 | Levy | |
| 2005/0108535 A1 | 5/2005 | Bruekers et al. | |
| 2005/0251683 A1 | 11/2005 | Levy | |
| 2005/0262347 A1 | 11/2005 | Sato et al. | |
| 2006/0031686 A1 | 2/2006 | Atallah et al. | |

OTHER PUBLICATIONS

Boneh et al, "Collusion Secure Fingerprinting for Digital Data," Dept. of Computer Science, Princeton University, 31 pages, 1995.

* cited by examiner

*Primary Examiner*—Vikkram Bali
*Assistant Examiner*—Katrina Fujita

(57) ABSTRACT

Various improvements and applications for digital watermarking technology are detailed. One concerns techniques for making watermarks resistant to malicious attacks. Another involves using digital watermarking with ID cards and credentials, such as a watermarked driver's license conveying a user's cryptographic PKI. Still another uses digital watermarks in connection with automated compliance audits for corporate users of electronic content. A variety of other technologies are also detailed.

6 Claims, No Drawings

WATERMARKING SYSTEMS AND METHODS

RELATED APPLICATION DATA

This application claims priority to provisional application 60/445,478, filed Feb. 5, 2003.

FIELD OF THE INVENTION

The present disclosure memorializes various improvements relating to digital watermarking.

BACKGROUND

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. Nos. 6,122,403 and 6,614,914 are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 details a number of connected-content applications and techniques.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's U.S. Pat. Nos. 6,408,082 and 6,614,914 detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

With the foregoing by way of background, the specification next turns to the various improvements. It will be recognized that these improvements can typically be employed in many applications, and in various combinations with the subject matter of the patent documents cited herein.

DETAILED DESCRIPTION

1. Template-Based Watermark Attacks and Countermeasures

Attacking the subliminal calibration signal found in some watermarks (e.g., the template signal) is one way of attacking a watermark. (One form of template is shown in the assignee's U.S. Pat. No. 6,408,082.)

To identify the template, some have proposed averaging many images so the images cancel each other while the template sums, thus making the template easier to identify (i.e. collusion). If the template were to cancel—rather than sum—when many images are averaged, it will be more robust to identification.

The idea is to add the template to some images and subtract the template from other images. The subtracted template may be more difficult to locate for authorized purposes since it is harder to find holes. Another approach would thus be to rotate the template, or shift the template in phase randomly throughout different images so that during averaging images the template won't sum. This approach is very useful if the analysis of the template is rotation invariant, such as used to determine the orientation and scaling of a watermark tile since the detector requires nothing extra to detect the collusion robust template versus a non-collusion robust template.

Yet another approach is to slightly scale the template. (The '914 technique is robust to both rotation and scaling.)

While the foregoing techniques address collusion attacks based on availability of several watermarked images, other attacks may be based on a single image, since the template signal is replicated many times within a single image. Such attacks may be redressed by obscuring the template, e.g., by designing it to only show up in an obscure, alternate domain (countless of which may be devised). Or to hide the template behind a key—using an invariant keying method that doesn't require additional search over different scale and rotation values to locate. (Such techniques are further detailed in published US patent application 20030012401.)

It will be recognized that such techniques can be applied to template signals of various forms. Such signals generally comprise collections of embedded features that can be used to facilitate computation of the geometric distortion of the embedded signal. An example is a constellation of peaks in a particular transform domain (e.g., fourier or autocorrelation). It will be recognized that such a collection of embedded features may result from an explicit template signal, or may be a desired consequence formed by patterning of the watermark (e.g., by regular tiling).

Related methodology helps perform preliminary detection of a template signal in the Fourier domain. It has three stages. First, find local maxima on half of the Fourier magnitude array. Then use the 90-degree rotation symmetry of the template to eliminate most of the local maxima in a quadruple, where in this stage certain tolerance is added. Third, check each pair of the left maxima in the quadruple to see if the angle between them and the ratio of their radial distances to the origin make them a pair of points on our template or not. If they are, what scale factor and orientation angle of the template in this case. After running through the total of about 50 maxima (for 128×128 block), accumulated count on a particular orientation and scale factor will indicate what the orientation and scale factor of the gird is when there is a template signal. A threshold is used to judge if there is a template signal or not. (This methodology avoids log-polar re-mapping, as is required by some other approaches.) Because this method is based on the ratios of the radial distances to the origin of any pair of template points, a variety of advantageous template designs may be achieved. (Additional details on related technology are to be found in application Ser. No. 10/302,753, filed Nov. 22, 2002.)

When using the template methodology just described, the template can be rotated differently in each image or each tile, and still be detected with similar effort as long as the template is symmetric when rotated by 90 degrees, because the symmetric template method is based upon this rotational symmetry of the template. By rotating the template in each image or tile, it shouldn't add for collusion attack as the peaks will be in different frequencies and phase.

2. MPEG Digital Watermark Detector with Drift Compensation

For video content embedded in baseband that has been compressed, the watermark detector can improve its detection by taking the inverse of drift compensation into account. Specifically, the detector could make an estimate of the watermark noise sequence that was included in the difference coefficients in a predictive frame and subtract this estimate from the difference to remove inappropriately placed watermark data. By removing this inappropriate watermark data, the image can be rendered without the interference, thus looking better, and the watermark can be detected with less interference.

More specifically, for the detector to remove the inappropriate watermark data, the watermark payload and embedding key, such as PN sequence, need to be known. In addition, the watermark data that was not embedded with a large local gain is probably not included in the difference of the predictive frame and should be ignored. Thus, for the detection process where only the key (e.g. PN sequence) is known, the payload can be estimated by detecting the payload without removing the inappropriate watermark data, and then from this estimate removing the inappropriate data and re-detecting the payload. This process can be done iteratively until the payload meets detection threshold criteria.

In addition, since the inappropriate watermark data can be removed, the video can be rendered with less interference from the watermark. If the watermark payload is constant through the video, the inappropriate watermark data can be removed from each frame without the iterative process once the payload is known. If the video can be detected non-linearly (i.e. detect on frames not related to the current frame being rendered, such as with a DVD), the detector can find key frames (e.g. I-frames in MPEG video) to detect the payload, especially key frames that have characteristics that enable the watermark signal to be embedded with a lot of gain, such as noisy I-frames in MPEG video with PN sequence based watermarking techniques.

Even if the content has been compressed more than once, this technique should help for the last compression.

3. Digital Identity Business Architecture

Consumers are used to physical identification (ID) cards being inexpensive.

This fact arises since these cards are usually government issued, and the government is not looking to make money and can subsidize the ID with tax money. However, For businesses to create digital identity, there must be money for the business to survive.

Asking a high price for the digital identity is usually not acceptable, since the consumer has to pay or the card price is related to other uses. For example, drivers licenses (DLs) with watermarks can be used to physically identify the driver of a car and can be used as a digital identity, but the DL cannot double in price or voters would not accept the change. However, if the watermarked DL is used for every online transaction, the company providing the watermark technology should be compensated for the value of its system.

A novel compensation method and architecture is to share in the e-commerce transaction with the provider of the digital identity card or enabling technology, as currently done with credit cards. The difference is that the sharing cost is not related to providing credit, and the system uses a different architecture than the credit card system, which withholds some of the payment to the retailer.

Before an item is purchased in an online environment, the consumer's identity must be electronically confirmed since there is no retailer to look at the person and, optionally, compare their name and picture to a credit card. There are several ways to prove identity, such as providing a digital certificate via registration authority or providing a watermarked ID card, such as drivers license, to secure software controlling a PC camera.

When any of these digital identity methods are provided, the digital identification system can require e-tailer (i.e. electronic retailer) to provide a fixed fee and/or fractional amount of the sale enabled by the digital identification system.

A preferred embodiment employs the following architecture. The verification of digital identity happens at the retailer and/or via a computer provided by the digital identification service provide—probably via a secure reader provided by the digital identity service provider. After this verification, a computer belonging to the digital identification service provider securely communicates with an e-tailer computer for the transfer of funds or credit for each transaction enabled by the digital identification.

The location of these two computers or systems is irrelevant. The fact that the digital identification computer is securely controlled by the digital identification service provider and that the e-tailer's computer is securely controlled by the e-tailer is the most important. In fact, these two "computers" could be part of one computer whose memory, processing and hard drive is securely divided, such as via Microsoft Palladium architecture.

Alternatively, if the transaction uses a credit card the credit card company may transfer the funds to the digital identification service provider. The architecture would be the same as above, except the credit card company replaces the e-tailer.

In a similar alternative embodiment, the credit card may have the digital identification as part of it, such as a watermark on the credit card or smart ID chip inside the credit card. In this case, the credit card company can still send the digital identity service provider the fee in the architecture as described above. However, the credit card company could withhold a larger amount than currently withheld during transactions, and share a percentage of the withholdings in a periodic, i.e. monthly, check with the digital identity service provider.

4. Database Format for Identifying Distribution Object

When an object is identified during distribution with an identification technology, an optimal database structure for storage of information is shown below. The database can be stored locally, such as if the identification method or similar item on the object has memory storage, such as a smart ID chip. The database can also be stored remotely, in any distributed format.

The database format includes fields for:

Product ID

Product Name

Product Description, i.e. what is contained

Raw Material IDs (linked list)

Manufacturer

Manufacture Contact Information, with name, phone, email, etc.

Recipient

Recipient Contact Information, with name, phone, email etc.

Origin

Destination

Destination Path (linked list with all desired locations)

Current Location (linked list with all past locations)

Inspections (linked list with all past locations)

Next Destination

Type/Risk

The linked list fields of the database will grow over time. Any of these lists can only include the information during the most recent inspection, or past few inspections, if it is desired for the database to be of fixed size. The IDs in the list can be proprietary or relate to any of the many standards, such as ePC (electronic product code), ISCI (Industry Standard Coding Identification), UPC, etc.

This is the beginning of such a list and format. Alternatively, the database can store the fields dedicated in PML and/or PDML, and these languages can be easily and dynamically created from the database, and the database can be easily and dynamically created from these languages.

5. Public Key Dissemination Using Watermarks

Documents and other watermarkable-objects (physical or virtual) can convey public keys. Thus, for example, a person's public key identifier may be digitally watermarked on her driver's license or business card. The PKI infrastructure has been developing for years, it is in every browser and it continues to mature. The issue with PKI isn't that the technology doesn't work; it's that last mile problem of having people get and understand the private keys and certificates. The way that most people best understand PKI is when they have something like a card that represents their identity and prompts them to show it (something they have) to demonstrate their identity. It's hard to get this concept across with software tokens but straightforward with a card because people do this all the time.

A cryptographic system could be integrated with common Internet browser software in a similar way that a smartcard would (although the keys would still have to be stored in software). The advantage of this is you could then hook into all of the PKI technology that exists out there for things like digital signatures and secure access via a printed card with a watermark.

A person could take an identity card home, present it in front of their webcam, and register their card—which behind the scenes generates the appropriate key pair on their machine (or perhaps on a key server) and creates a digital certificate.

There may also be a signing scheme where a person with one of these cards could digitally sign and print something like an encrypted hash into the image. And then a receiver of the document could receive it, retrieve the embedded id and encrypted hash, look up the digital certificate using the embedded id, and validate the signature.

A magnetic stripe card could do this as well, as a smart card or watermarked object, or a token conveying an RFID chip or bar code.

Such technology also addresses the problem of locating the public key of someone who has sent me information, such as an email. Watermarked business cards can link to the public key, along with a software program that automatically enters my contact information into another program, such as Microsoft's Outlook e-mail and personal information management software.

6. Watermark-Based Copyright Compliance Audits

Watermarks could be used for doing corporate compliance audits. Idea would be that content owners or others would watermark content (audio, video, images, text documents) and then corporations/organizations/government agencies could then run compliance audits (similar to the manual software audits that are done of some companies today but using watermarks to automate the process).

Watermark detection toolkits could be deployed on a corporate intranet to look at servers, databases and desktop PC's to see if they have any watermarked content that is identified as copyrighted and report back its location and what it is.

Could also be deployed at the corporate firewall to: filter content out, keep content in, and report on what is being viewed/downloaded over/onto the corporate internet. This could be used by companies as a risk management tool to help them control copyrighted material form being inappropriately used/stored/copied on their internet.

The same techniques can also employ fingerprinting to identify objects.

7. Metallic Ink on Identification Cards

Magnetic inks or inks with metallic objects may be used to give a printed image on a card the ability to be read by an RF reader. A less expensive RFID card may thus be produced with the print providing the response.

There is a class of detectors that are used for magnetic imaging of features on currency, like the ones used by the Federal Reserve Bank for check and banknote sorting, which are able to recover small amounts of data (patterns really) from structures to determine whether a bill is genuine or counterfeit. Some examples are shown on the website of San Diego Magnetics, at the sdmagnetics.com domain.

A related concept is to form a diffraction grating on an identity card using metallic, magnetic, or other inks having desired diffraction qualities at the frequencies of interest. To keep the physical dimensions small enough for use on a card, energy in the microwave, IR, visible, or UV wavelengths may be required.

The diffraction grating may be formed on one side of the card, with the other serving as a uniform reflective plane (e.g., metal or otherwise). Reflective media may also be embedded within the card. The goal is to make the slit appear bigger than it is to provide the diffraction pattern for RF, since RF is much larger wavelength than visible light.

To provide a comprehensive disclosure without unduly lengthening this specification, the patents and applications cited above are incorporated herein by references.

Having described and illustrated the subject technologies with reference to illustrative embodiments, it should be recognized that the invention is not so limited.

For example, while the detailed description focused on digital watermarks, other techniques can be used as well depending on the particular application context (e.g., VBI, digital fingerprints, header meta data, bar codes, glyphs, RF IDs, mag stripes, smart card technology, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

We claim:

1. In a method that includes encoding one or more content objects with a steganographic digital watermark, the encoding including embedding a collection of features that can be used to facilitate computation of geometrical distortion of the object after encoding, the geometric distortion including rotation, an improvement including step for making the collection of features resistant to collusion attack.

2. The method of claim 1 wherein said step includes adding said collection of features in some of said objects, and subtracting said collection of features from other of said objects.

3. The method of claim 1 wherein said step includes embedding said collection of features at a first scale in a first object, and embedding said collection of features at a second, different scale in a second object.

4. The method of claim 1 wherein said step includes embedding said collection of features at a first orientation in a first object, and embedding said collection of features at a second, different orientation in a second object.

5. The method of claim 1 wherein said step includes obscuring said collection of features by designing same to become apparent only in an alternate domain.

6. An object produced by the process of claim 1.

* * * * *

UNITED STATES PATENT AND TRADEMARK OFFICE
CERTIFICATE OF CORRECTION

| | | |
|---|---|---|
| PATENT NO. | : 7,702,125 B2 | Page 1 of 1 |
| APPLICATION NO. | : 10/774312 | |
| DATED | : April 20, 2010 | |
| INVENTOR(S) | :Levy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 USC 154(b) by 1617 days.

Signed and Sealed this

Eighteenth Day of January, 2011

David J. Kappos
*Director of the United States Patent and Trademark Office*